Jan. 14, 1936. E. E. MURRAY 2,027,925
METHOD AND APPARATUS FOR CUTTING FABRIC BLANKS
Filed Dec. 4, 1934  2 Sheets-Sheet 2

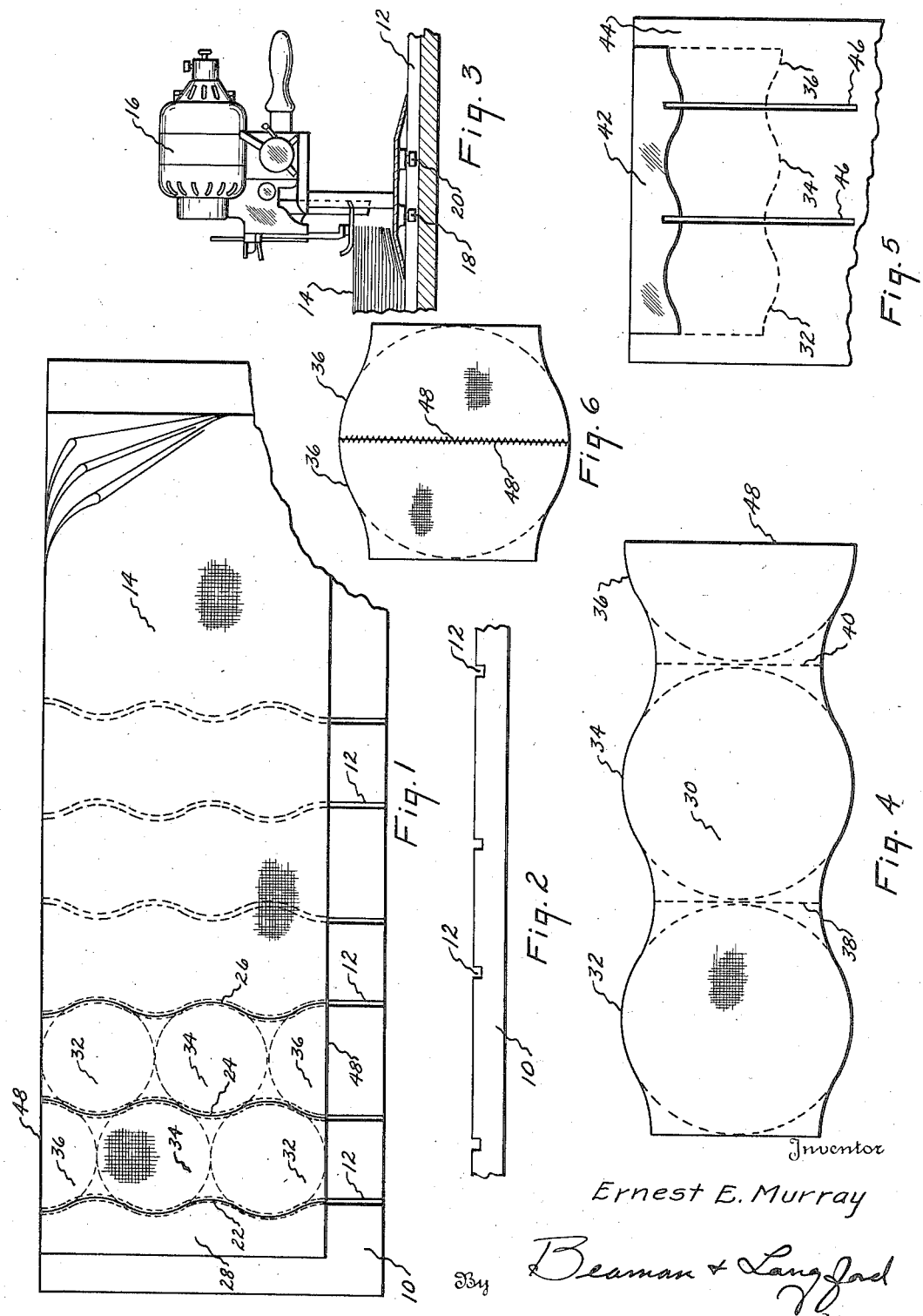

Inventor
Earnest E. Murray

By Beaman & Langford
Attorney

Patented Jan. 14, 1936

2,027,925

UNITED STATES PATENT OFFICE 2,027,925

METHOD AND APPARATUS FOR CUTTING FABRIC BLANKS

Ernest E. Murray, Jackson, Mich., assignor, by direct and mesne assignments, of one-fourth to Joseph W. Myers, Philadelphia, Pa., and one-half to L. W. MacFarland, Long Island City, N. Y.

Application December 4, 1934, Serial No. 755,919

12 Claims. (Cl. 164—17)

The present invention relates to improvements in apparatus and method for the cutting of fabric blanks to be employed in the manufacture of buffs and the like, particularly full disc buffs, and has as its object to devise a method of cutting blanks from standard widths of fabric to make up buffs of different diameters with a minimum of waste.

Heretofore at least one attempt has been made to minimize the waste that results from standard practice for cutting fabric blanks for buffs. Reference is made to the method disclosed in the patent to Zimmerman, No. 1,849,779, in which hexagonal blanks are die cut from the fabric lengths; die cutting operation being arranged so that half blanks result, which are sewed together to provide whole blanks.

According to the present invention, the necessity of expensive die cutting equipment is eliminated and costly maintenance is avoided by the provision of a simple fixture permitting the employment of a standard vertical blade cloth cutter or the like. In carrying out the improved method, the fabric lengths are laid up and the cutter directed along undulate or sinuous paths; the paths of cutting approximating the contour of the circular discs of the finished buffs for substantial extent along arcs of circles. As will be more fully disclosed hereinafter, my new method grooves 12 would extend over a distance of 40" desired thickness and the blanks are so laid out that all resulting halfs for standard buffs cut from standard widths of fabric have a selvage edge.

Figure 7:
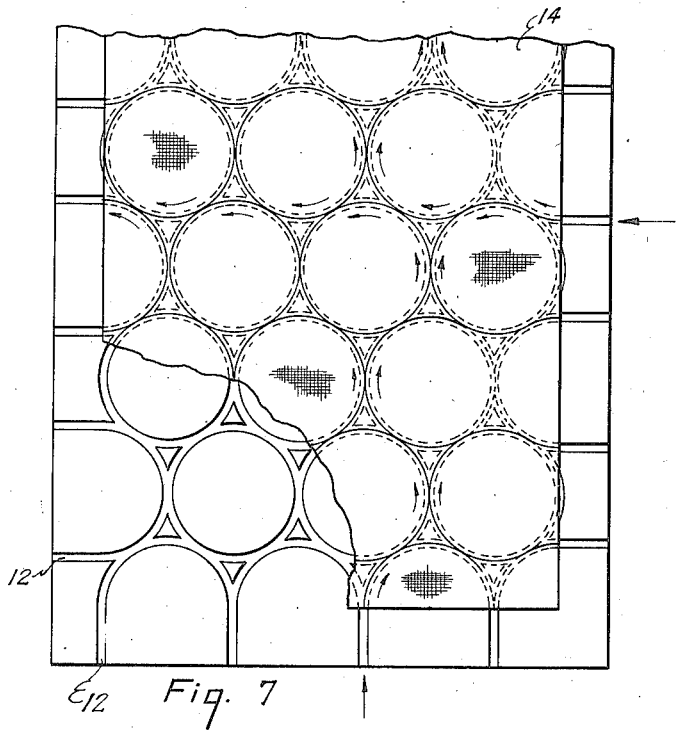
Figure 8:
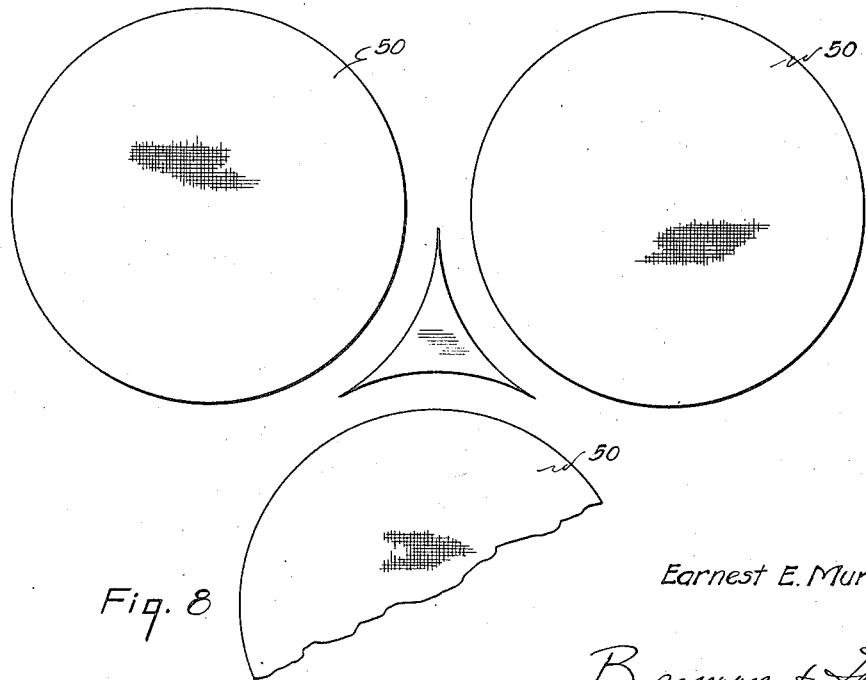

In order that my improved method may be fully understood, a preferred arrangement is illustrated in the accompanying drawings, in which Fig. 1 is a plan view of the fabric lengths laid up upon a suitable table fixture, Fig. 2 is a side view of a portion of the table fixture, Fig. 3 is a side elevational view of one suitable form of fabric cutter, Fig. 4 is a plan view of a transverse section cut from the fabric lengths, Fig. 5 is a plan view of a suitable fixture for cutting the section shown in Fig. 4 into blanks, Fig. 6 is a plan view of a blank made up from two halves sewed along selvage edges, Fig. 7 is a plan view of fabric laid up on a suitable table fixture having both transverse and longitudinal grooves, and Fig. 8 is an exploded view showing the fabric after it has been cut, and the roughly triangularly shaped section of fabric resulting from the cutting.

In the consideration of the present invention, it is to be kept in mind that in commercial production it is necessary to cut at one time fifty or more thicknesses of fabric. This necessitates the employment of sturdy cutting equipment and prevents the cutting of sharp corners except by the use of cutting dies. It is for this reason that a method as described in the aforesaid patent can only be carried out commercially with expensive equipment and with high maintenance cost. With my improved method a suitable supporting surface or cutting table 10 is provided having associated therewith suitable guides or templates which may take the form of grooves 12, as shown in Figs. 1 and 2. Preferably the grooves 12 extend entirely across the table and with the exception of a feed in portion at the forward end define sinuous or undulate paths.

The length of fabric 14 as it comes from the loom is lapped to and fro upon itself upon the table 10 until the desired number of thicknesses have been laid up. This will provide only looped portions of fabric at one end. By way of example, the fabric 14 may be of standard 40" width and the grooves 12 laid out to cut 16" buffing wheels. In this case the undulation of the grooves 12 would extend over a distance of 40" and would be of such curvature as to define portions approximating the contour of finished circular discs. With some suitable cutter 16 equipped with suitable follower mechanism, such as rollers 18 and 20, the operator directs the cutter along the grooves 12 severing the layers of fabric along lines 22, 24 and 26. The looped end portions of the fabric as at 28 when severed along the line 22 may be opened up to give a section as shown at 30 in Fig. 4. Likewise, the thickness of fabric between the lines 22, 24 and 24, 26 will produce sections as shown in Fig. 4.

Referring to Fig. 4, the section 30 consists of areas 32 and 34 from which full discs are cut as denoted by the dotted outline and area 36 from which a semicircular disc is obtained, likewise denoted by dotted outline. The areas 32, 34 and 36 are preferably separated along the dotted lines 38 and 40 by being aligned in a fixture 42 carried by a supporting surface 44 and provided with grooves 46 similar to the grooves 12 along which the cutter 16 is directed. After being separated along the lines 38 and 40, the areas 32 and 34 are trimmed to form circular discs, the area outside the dotted circle in Fig. 4 constituting waste. It will be noted that the chord 48 of the semicircular disc area 36 is the selvage edge of the fabric. These semicircular areas are sewed together as shown in Fig. 6 and trimmed to provide full discs.

Cotton sheeting conventionally used in making full disc buffs is woven in standard 36" and 40" loom widths with selvage edges. Standard disc buffs are 12", 14", 16" and 18" in diameter. In the example shown in Fig. 1, 40" fabric is imposed upon a fixture for cutting 16" buffs. It should be apparent that from each section 30 full discs may be cut from the areas 32 and 34 and half discs from the area 36. In cutting 14" buffs from 36" fabric, I prefer to lay out the discs slightly oversize in order to absorb the extra inch of material and obtain selvage edges for the half discs. As 12" and 18" are multiples of 36", alternate transverse sections will provide only full discs while intermediate sections will include half discs at each side as should be obvious without illustration. It is of course understood that different fixtures will have to be used with different size buffs and widths of fabric.

It is within the contemplation of the present invention to employ longitudinal undulating grooves on the table 10 in lieu of transverse grooves. Also, the use of both transverse and longitudinal undulating grooves as shown in Fig. 7 may be employed within the scope of the present invention. When transverse and longitudinal grooves are used fabric discs 50 are obtained directly. With such an arrangement weights may be required to hold the fabric in position during the cutting operation. Also the employment of a pattern or templates in lieu of grooves or guides in the table 10 is contemplated for directing the cutter along the desired undulate paths.

From the foregoing description when considered in connection with the accompanying drawings, it should be apparent to those skilled in the cutting of fabric discs for buffs that I have provided a method of cutting up fabric lengths which greatly reduce the customary amount of waste yet can be carried out without the employment of expensive equipment.

What I claim as new and desire to protect by Letters Patent is:

1. As a step in a method of cutting circular fabric discs comprising the severing of a fabric strip along spaced symmetrical undulate paths, said paths tracing arcs of imaginary circles scribed upon said strip, said circles being of substantially equal diameter and having their centers located in substantially parallel rows and spaced substantially the distance of a diameter, the centers of the circles of alternate rows being spaced substantially a diameter from centers of adjacent circles of intermediate rows.

2. As a step in a method of cutting circular fabric discs comprising the severing of a fabric strip along spaced symmetrical undulate paths, said paths tracing arcs of substantially tangential imaginary circles scribed upon said strip.

3. As a step in a method of cutting circular fabric discs comprising severing of a fabric strip along undulate paths tracing arcs of tangential imaginary circles scribed upon said strip.

4. As a step in a method of cutting circular fabric discs comprising transversely severing a fabric strip along spaced undulate paths, severance taking place substantially along the arcs of the periphery of the final circular discs.

5. In a method of cutting circular and semicircular discs from a fabric strip, said discs having their centers located along parallel lines with opposite discs in substantially tangential arrangement, the step of severing the strip along an undulated path conforming to arcs of the periphery of the circular discs.

6. In a method of cutting circular and semicircular discs from a rectangular fabric strip, the step of severing the strip along spaced symmetrical undulate lines to give an elongated section having an outline defining arcs of discs to be cut from the section.

7. A method of cutting up standard widths of fabric lengths as a step in the making of circular discs for buffs and the like comprising superimposing thicknesses of fabric upon a supporting surface, and transversely severing the fabric along symmetrical undulate paths to provide sections, the outlines of said sections being partly defined by arcs of circular discs to be cut therefrom.

8. A method of cutting up standard widths of fabric lengths as a step in the making of circular and semicircular discs for buffs and the like comprising superimposing thicknesses of fabric having selvaged edges upon a supporting surface, transversely severing the fabric along symmetrical undulate paths to provide sections, the outline of said sections being partly defined by arcs of circular discs to be cut therefrom and at least one selvaged edge of said sections constituting a chord of a semicircular disc.

9. A step in the method of cutting up standard 36" and 40" width fabric lengths into approximately 12", 14", 16" and 18" circular and semicircular discs for buffs and the like comprising superimposing thicknesses of fabric upon a supporting surface, and severing the fabric by directing a cutter along a pattern tracing undulate paths, the curvature of which conforms approximately to arcs of the discs to be cut.

10. A step in the method of cutting up standard 36" and 40" width fabric lengths into approximately 12", 14", 16" and 18" circular and semicircular discs for buffs and the like comprising superimposing a suitable number of thicknesses of fabric upon a supporting surface, severing the fabric into transverse sections by directing a cutter along patterns tracing spaced symmetrical undulate paths, said paths being defined by arcs of tangential circles having centers spaced along parallel lines, the diameter of said circles approximating the diameter of the discs to be cut.

11. An apparatus for cutting out discs from fabric lengths comprising an elongated supporting surface upon which fabric is adapted to be lapped to and fro to provide the desired thickness, and transversely extending spaced symmetrical undulated guides associated with said surface along which a cutting mechanism is adapted to be guided, the curvature of said guides being defined by arcs of tangential circles having centers spaced along parallel lines, the diameter of said circles approximating the diameter of the disc to be cut.

12. A device of the character described for cutting out discs from fabric, comprising a supporting plate for receiving thereon the material to be cut, a plurality of undulate grooves in the surface of said plate, the component arcs thereof being arcs of tangential circles having centers spaced along parallel lines, the diameters being substantially those of the discs being cut, a follower movable in said grooves, and means secured to said follower for cutting said material along lines following said undulate grooves.

ERNEST E. MURRAY.